United States Patent [19]

Nelson

[11] 4,318,218
[45] Mar. 9, 1982

[54] METHOD OF MAKING A DYNAMOELECTRIC MACHINE STATOR ASSEMBLY

[75] Inventor: Donald A. Nelson, Scotia, N.Y.

[73] Assignee: General Electric Co., Schenectady, N.Y.

[21] Appl. No.: 235,072

[22] Filed: Feb. 17, 1981

Related U.S. Application Data

[62] Division of Ser. No. 65,662, Aug. 10, 1979, Pat. No. 4,284,920.

[51] Int. Cl.³ ............................................. H02K 15/14
[52] U.S. Cl. ........................................ 29/596; 310/42; 310/217; 310/258
[58] Field of Search .................. 29/596; 310/217, 216, 310/91, 254, 258, 259, 42

[56] References Cited

U.S. PATENT DOCUMENTS 1,784,649 12/1930 Wood ............................... 310/217 X
3,787,744 1/1974 Saito .................................... 310/217
3,940,648 2/1976 Wielt et al. .......................... 310/217
4,128,780 12/1978 Sonobe ................................ 310/269

*Primary Examiner*—Carl E. Hall
*Attorney, Agent, or Firm*—Vale P. Myles

[57] ABSTRACT

A packaged stator core assembly and a method of making such an assembly and mounting it on a housing frame. Arcuately spaced tension ribs secure two annular clamping flanges in compression against opposite ends of a stack of stator laminations. Torque ribs, each having an angular cross-section and a key portion located substantially at its shear center, are welded between the clamping flanges to hold the ribs in engagement with positioning slots or tabs on the outer periphery of the stacked laminations. The lines of reaction torque force from the laminations to the ribs pass essentially through the shear centers of each rib. In the method of the invention the ribs are welded to the clamping flanges and the stator core package is mounted in a housing frame by welding only the flanges to the frame.

2 Claims, 4 Drawing Figures

METHOD OF MAKING A DYNAMOELECTRIC MACHINE STATOR ASSEMBLY

This is a division of application Ser. No. 65,662, filed Aug. 10, 1979 now U.S. Pat. No. 4,284,920.

BACKGROUND OF THE INVENTION

This invention relates to packaged stator core assemblies for dynamoelectric machines and more particularly, to a stator core assembly that rigidifies the stack of stator laminations and enables it to be easily and rigidly mounted within an associated housing.

Stator assemblies for dynamoelectric machines are either manufactured by stacking stator laminations in place in a suitable stator frame, or are made by completing a package of stator laminations and an associated stator winding, which is then mounted in operating position in a suitable frame. The former manufacturing method is generally used for various large machines where packaged stator assemblies are impractical due either to the size of the structure involved or due to the relative uniqueness of given stators for such machine sizes. Packaged stator core assemblies afford numerous manufacturing advantages, therefore, such assemblies are generally preferred and are frequently employed where the relative size and anticipated manufacturing volume of a given machine design justifies the use of such packaged cores. In addition to the cost savings and improved quality of manufacture that can be achieved by utilizing a packaged stator core assembly, it has been recognized that such assemblies can often be made tighter than stacked-in-place stator assemblies. Improved tightness of a stator assembly is particularly desirable where a dynamoelectric machine is to be applied in an environment that will subject it to seismic shock or other extreme mechanical vibrations that loosen the stator assembly and thereby impair its operating characteristics.

One form of a successful packaged stator core assembly design known in the prior art is disclosed in U.S. Pat. No. 3,940,648, which issued on Feb. 24, 1976 and is assigned to the same assignee as the present invention. The type of core packaging assembly illustrated in that patent has been found very suitable for use in the manufacture of horizontally mounted dynamoelectric machines because the stator-lamination clamping end flanges and the torque ribs of such a packaged stator assembly can all be welded to associated frame members of a rigid housing. Thus, the reaction torque developed in the stator laminations by operation of the machine are transmitted to the housing frame through the flanges and through intermediate so-called fishplate members that are welded between the torque ribs of the stator package assembly and intermediate housing frame plates. Although such a prior art packaged stator assembly is suitable for manufacturing horizontal machines, it is not ideally suited for use in the manufacture of vertical axis machines. In fact, due to the absence of core-to-frame connections between the stator clamping flanges of such vertical axis dynamoelectric machine housings, the use of stator core package assemblies such as those shown in the above-mentioned patent would not appear to be possible. The present Applicant is aware of only a few other types of packaged stator assemblies that have been used in manufacturing vertical axis dynamoelectric machines. These prior art packaged core arrangements use relatively flexible rectangular bars that are keyed to stator laminations and to clamping end flanges and the rectangular bars are welded directly to a housing frame. Such arrangements do not afford as tight and rigid a package core assembly and system for transmitting reaction torque from a vertically mounted core to a housing frame as does the present invention.

In addition to that shortcoming of known prior art packaged core assemblies, i.e., the inability to be utilized in the manufacture of a vertical-axis machine, the prior art packaged stator assemblies known to the Applicant have been found to possess other drawbacks. One of these drawbacks is that it is necessary to maintain access to the torque ribs of such stator cores after the cores are positioned within their housing frames, so that fishplates, which must be welded between the torque ribs of a given stator core package and the frame of its housing, can be welded in their operating positions. Thus, such assemblies are exposed to contamination from the manufacturing area until the access openings in the housings can be closed. In addition to such potential general housekeeping type of contamination of prior art stator assemblies, a considerable risk of further contamination to such stator assemblies exists due to the fact that the welding procedures for installing the needed fishplates inevitably creates a considerable amount of weld splatter and chip particles which may enter the stator air ducts or other portions of the stator package assembly. This further contamination problem is increased by the common need to apply multiple-pass fillet welds on the fishplates in order to make the welds of sufficient strength to resist the torque stresses that will be applied to them during operation of the machine. Because of such contamination problems it is always necessary to perform concomittant cleaning operations as a consequence of the use of such packaged stator assemblies, thus the cost of manufacture is increased. In addition, there exists the risk that all weld splatter particles and other contaminants may not be found and removed from the machine before it is put into operation. Finally, after such a machine has been cleaned, it is then necessary to close the access areas left in the housing in order to effect the needed fishplate welding operations. Typically, these access openings are closed by welding plates over them. Consequently, there is a further risk of weld splatter particles, resulting from such final welding operations, being splattered into the machine enclosure.

In addition to the foregoing disadvantages encountered in the use of known prior art packaged core assembly structures, it has been found that the extensive, relatively large welds needed to secure the torque ribs of such stator assemblies to the necessary fishplates and the housing frame members can cause thermal distortion of the frame. Moreover, the welded enclosure portions of such housings cannot be made as clean as the remainder of the housing bodies, which are typically shotblasted and painted prior to the closing welding operations. An undesirable corollary effect of welding the needed heavy fishplates between the torque ribs and a housing frame of such a prior art machine is that the overall weight of the machine is increased.

OBJECTS OF THE INVENTION

A primary object of the invention is to provide a stator core package assembly that overcomes the above-noted drawbacks of related package assemblies.

Another object of the invention is to provide a stator core package assembly that can be used successfully in the manufacture of either horizontal or vertically mounted dynamoelectric machines.

A further object of the invention is to provide a packaged stator assembly that maintains its rigidity and tightness better than any known prior art packaged stator assemblies.

Yet another object of the invention is to provide a stator core assembly that is lighter in weight and suitable for easier and better mounting in an associated frame than is possible with known prior art stator assemblies and associated mounting means.

Still another object of the invention is to provide a packaged stator core assembly that can be readily mounted in fixed relationship within a housing frame that is substantially closed, except for axial end openings therein, at the time the assembly is fastened to the housing frame.

Another object of the invention is to provide a stator core assembly having torque ribs that are shaped to minimize the restriction of cooling air flow from radial ducts through the stator laminations.

A further object of the invention is to provide a method for manufacturing a dynamoelectric machine having a tight and rigid stator core assembly easily and inexpensively mounted therein.

Additional objects and advantages of the invention will be apparent to those skilled in the art from the description of it presented herein considered in conjunction with the accompanying drawings.

SUMMARY OF THE INVENTION

In one preferred embodiment of the invention a dynamoelectric machine stator core assembly is formed by compressing a stack of stator laminations between a pair of annular flanges positioned respectively over the opposite ends of the stacked laminations. The flanges are secured in a predetermined spaced relationship by a plurality of arcuately spaced tension bars the opposite ends of which are welded respectively to the flanges. According to the invention a plurality of torque ribs, each having a predetermined angular cross-section, are also mounted at arcuately spaced points around the stacked laminations and are welded respectively at their opposite ends to the flanges. A key portion formed on the apex of each torque rib is positioned in locking engagement with positioning means on the peripheral surface of the stacked laminations so that the shear center of each torque rib is positioned in substantial alignment with a tangent to the stator laminations that intersects the positioning means adjacent to the ribs.

In the preferred method of the invention, such a packaged stator core assembly is mounted in a housing frame by welding only the two stator flanges to the housing frame.

DESCRIPTION OF THE PREFERRED EMBODIMENTS

From the description of the invention presented herein, it will be apparent to those skilled in the art that the invention can be advantageously utilized in manufacturing dynamoelectric machines that are adapted for rotation about either a vertical axis or a horizontal axis. Because the reaction torque paths for a vertical dynamoelectric machine design imposes more rigorous demands on a packaged stator core assembly than is placed on such an assembly in a horizontal machine, the description of the invention presented herein will be of an embodiment of the invention for use in a dynamoelectric machine having a vertical axis of rotation.

Figure 1:
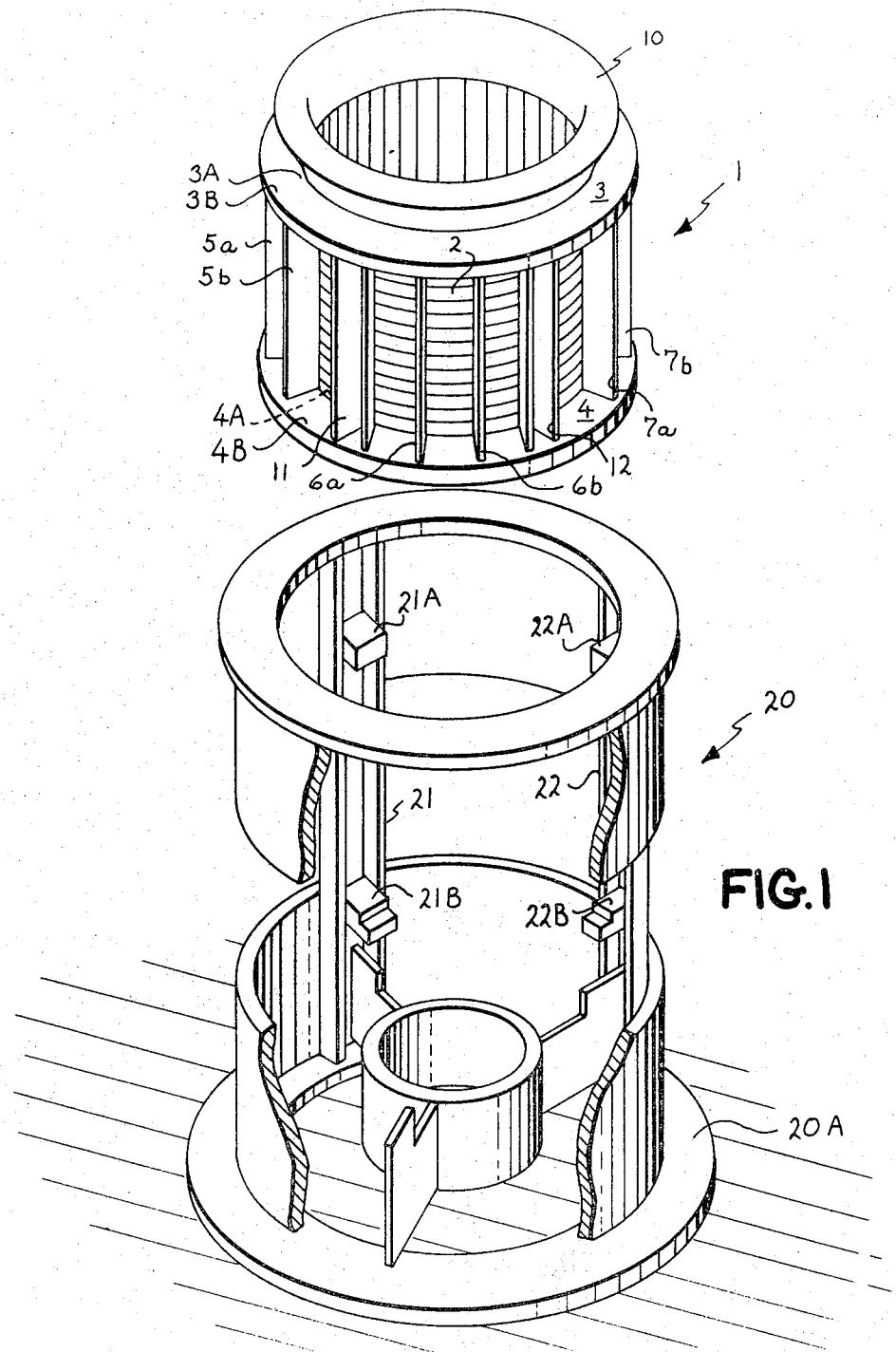
FIG. 1 is a perspective view, partly in cross-section, of front, top and internal portions of a dynamoelectric machine stator core assembly and an associated mounting frame, all constructed according to the invention, depicting the core assembly partially removed from the frame.
Figure 2:
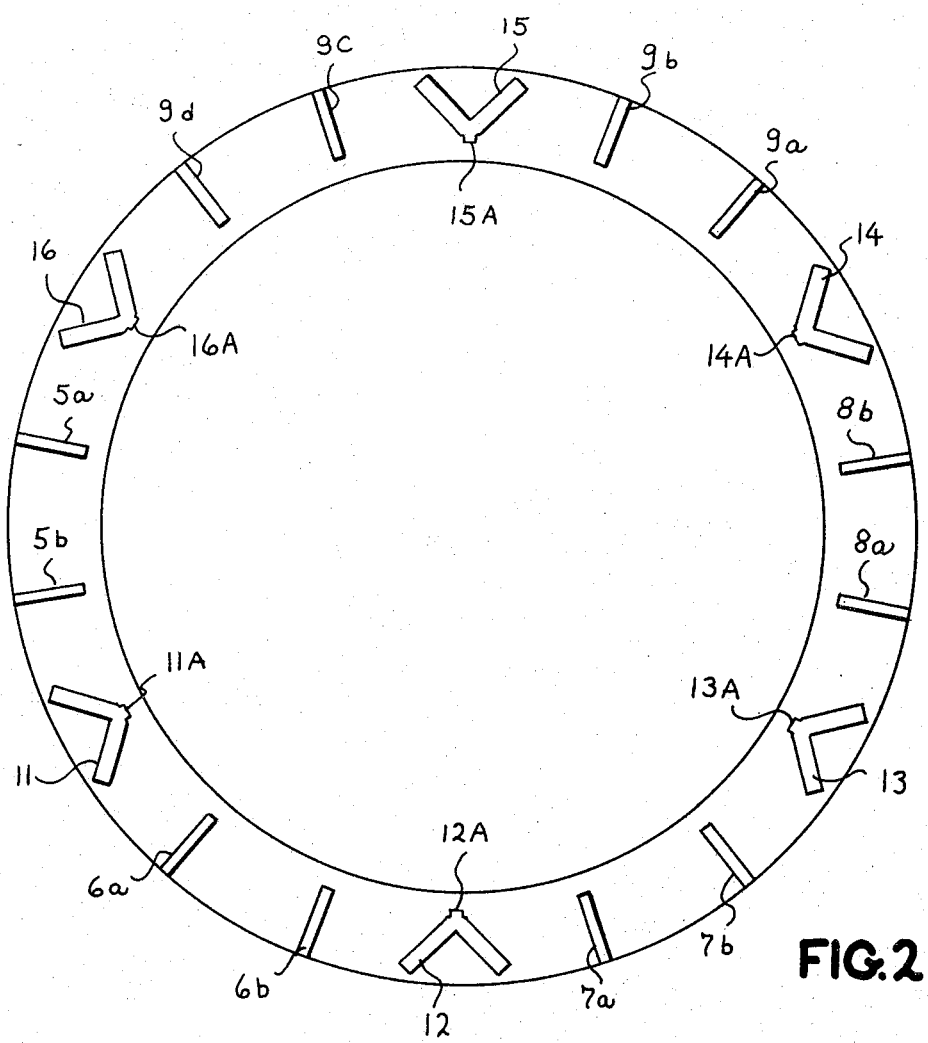
FIG. 2 is a top plan view of the stator clamping tension bars and torque ribs used in the stator core assembly shown in FIG. 1, showing those components and the bottom clamping ring. (The top clamping ring is not shown in FIG. 2).

Referring now to FIG. 1, it will be seen that there is shown a dynamoelectric machine packaged stator core assembly 1 that includes a stack 2 of generally flat, conventionally insulated metal laminations that are arranged in mutually facing relationship to define a bore through the center of the stack for receiving a rotor (not shown), which is adapted in any suitable well-known manner to be mounted within the bore in rotatable relationship to the stator. First and second annular clamping flanges 3 and 4 are positioned, respectively, over opposite ends of the stacked laminations 2 with inner portions 3A, 4A of each flange 3 and 4 over the laminations, and outer portions 3B, 4B, extending radially outward beyond the outer peripheral surface of the stack 2, as clearly shown in FIG. 1. In order to secure the clamping flanges 3 and 4 in a predetermined spaced relationship that exerts a continuous compressive force on the stacked laminations 2, a plurality of tension bars are arcuately spaced around the peripheral surface of the stator 2. The ends of each of the tension bars are affixed respectively to the outer portions 3B, 4B of the respective flanges 3 and 4 by being welded thereto. In the embodiment of the invention being described here, twelve such tension bars are used to secure the flanges 3 and 4 in their desired compressive relationship to the stack 2; however, it should be understood that a greater or lesser number of such tension bars may be used on other forms of packaged stator core assemblies constructed according to the invention. Six of the tension bars 5A, 5B, 6A, 6B, 7A and 7B are shown in FIG. 1, and are also illustrated in FIG. 2. The relatively equally spaced relationship of those six bars and the remaining six tension bars used in this embodiment can be seen in FIG. 2. The other bars are identified generally by the reference numbers 8a, 8b and 9a through 9d in FIG. 2. Each of the tension bars 5A–9D has its respective ends welded to the radially outwardly extending portions 3B and 4B of the sides of the annular clamping flanges 3 and 4 that face the ends of the stack 2. Various suitable techniques can be used to perform such welding, but a preferred method for affixing such tension bars to associated clamping flange rings is described in U.S. Pat. No. 3,940,648.

The stator core assembly 1 also includes a plurality of conventional energizing coils 10 that are suitably mounted in axially-extending winding slots, which are formed at equally spaced points around the inner circumference of the stacked stator laminations in any conventional well-known manner. Of course, suitable connections (not shown) are also provided to connect the coils 10 to a source of energizing electric power.

To complete the packaged stator core assembly 1, according to the invention, a plurality of torque ribs 11 through 16 (also see FIG. 2) are positioned at about equally arcuately spaced points around the periphery of the stator 2. Each of the torque ribs 11-16 is substantially identical to one another and is about equal in length to one of the tension bars 5A-9D. In the embodiment of the invention being described, each of the torque ribs is generally V-shaped in cross-section, as can be best seen in FIGS. 2 and 3 where end views of the torque ribs are illustrated. In addition, each of the torque ribs includes a key portion that projects from the outer surface of the apex of each rib. Such a key portion 11A is clearly illustrated in FIG. 3 at the apex of the torque rib 11.

To provide a cooperating locking means for the respective key portions of the torque ribs 11-16, a plurality of arcuately spaced positioning means is formed around the stator 2. In the form of the invention shown in the drawing, the positioning means comprise a plurality of axially-extending longitudinal slots such as the slot 2A, each of which are adapted to receive therein the respective key portions 11A-16A of the adjacent torque ribs. Each of the slots 2A, etc. may take a variety of forms, such as the generally dovetail form illustrated in FIG. 3, or may be simply a rectangular-sided channel form in other embodiments. Moreover, in alternative embodiments of the invention the positioning means may be formed by making radially projecting tabs on arcuately spaced points of the exterior surface of the stator 2, so that such tabs will be engaged in locking relationship with the respective key portions 11A through 16A on the torque ribs. In such cases the respective tabs on the stator would each form, with adjacent tabs, a rib that projects outwardly from the generally cylindrical outer peripheral surface of the stator 2, into engagement with the associated key portion of a torque rib. As the description of the invention proceeds, it will be understood that still other types of positioning means could be used to achieve the desired functions afforded by the preferred slot (2A) positioning means. For example, the positioning means could take the form of welds applied to join the respective apices of the torque ribs (11-16), or their key portions (11A, etc.) to the laminations of stator 2 at predetermined points.

The important feature of each of the positioning means, whether they be slots formed in the stator 2 or ribs defined by tabs projecting from the outer surface of the stator, is that the positioning means be effective to engage one of the torque rib key portions in locking relationship therewith at a point that puts the line of reaction force in substantial alignment with the shear center of the torque rib.

The laminations of stator 2 are rigidly secured against rotation relative to the clamping flanges 3 and 4 by securing the opposite ends of each of the torque ribs in fixed relationship to the outer portions 3B and 4B, respectively, of the clamping flanges. As was noted above, the extended weld areas afforded by the V-shaped torque ribs as is best shown by the welds 18A, 18B and 19A, 19B in FIG. 3 of the drawing, makes it possible with the invention to provide adequately strong welds with a single weld fillet along each side of the torque ribs. Thus, it is not necessary to make multiple weld passes in the manner described above relative to some prior art stator core packaging techniques. The ends of each of the torque ribs 11-16 are thus mounted, respectively, in fixed relationship to the outer portions 3B or 4B of the respective clamping flanges so that the key portion of each torque rib is positioned in engagement with an associated positioning means (one of the slots 2A, etc., in this embodiment), thus securing the stator laminations against rotation relative to the flanges 3 and 4.

In the preferred embodiment of the invention being described, each of the torque ribs 11-16 is formed with a V-shaped cross-section defined by its respective sides so that the angle between the rib sides is about 90°, and the ribs are affixed to the clamping flanges 3 and 4 in a manner such that the angle between one side of each torque rib and a tangent to the stator 2 at its junction with the torque rib is about 45°. It should be understood that a range of other angles for the relative orientation of the sides of the torque ribs are acceptable in practicing alternative forms of the invention. For example, the angle defined by the respective sides of each of the torque ribs may be in the range of 120° to 45° and the ribs will still afford the desired objectives of the invention. Specifically, it should be understood that an important feature of the torque ribs, and their mounting to the flanges, is that they be mounted in locking engagement with the respective positioning means so that the shear center of each rib is substantially in alignment with a line of force applied to the torque rib through an associated positioning means (such as one of the slots 2A, etc.). Thus, rather than being subjected to a potentially destructive twisting or turning torque, as would be the case if the torque ribs were rectangular in cross-section and, thus, had a shear center spaced a substantial distance from the line of force applied by the positioning means, the V-shaped torque ribs rigidly resist any movement of the stator laminations 2.

It should also be understood that in alternative forms of the invention the torque ribs 11-16 may be modified so that the respective sides of each rib are substantially different in length. The important characteristic of the ribs that must be maintained in practicing such modifications of the invention is to assure that the shear center of each torque rib is positioned in substantial alignment with the line of force applied to the rib by its engagement with the stator positioning means, whether such positioning means are an abutting slot or a ridge of tabs extending from the stator. Generally speaking the shear center of each angular torque rib is located at the juncture of the two sides of the ribs, i.e., essentially in the location of the center axis of the key portion 11A shown in FIG. 3 of the drawing, even if the sides of the rib are of different lengths.

Because of the optimum relationship between the shear center of the torque ribs 11-16 and the positioning means (2A, etc.) the invention provides substantially greater rigidity to the stator core assembly 1 than could be afforded by an appreciably larger rectangular torque rib. Thus, the overall weight of the stator core assembly is substantially reduced relative to such prior art torque rib arrangements, and at the same time the tightness and rigidity of the core assembly is improved relative to those earlier designs.

Figure 3:
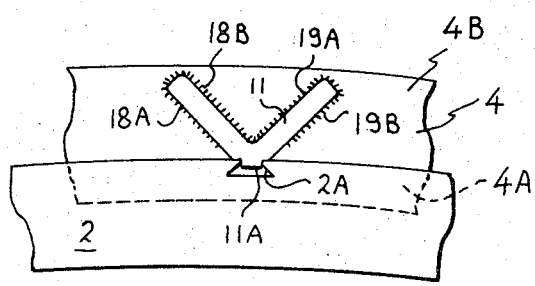
FIG. 3 is a fragmentary top plan view, partly in cross-section, of a portion of the stator core assembly shown in FIGS. 1 and 2, illustrating one end of a V-shaped torque rib and part of a clamping flange to which the rib is welded.

Another desirable feature of the torque ribs 11–16 of the invention should be noted at this point. Referring to FIGS. 1 and 3 it will be seen that the V-shaped torque ribs, being relatively narrow at their points of contact with the stator 2 provide a minimum amount of restriction to cooling air that will flow through radial cooling ducts (not shown) in the stator when it is placed in operation. Thus, the cooling characteristics of the packaged stator assembly 1 are enhanced by the invention.

Referring again to FIG. 1, further advantages of the invention will now be explained. Shown below the stator core assembly 1 is a fabricated steel housing 20 comprising a plurality of vertically positioned frame struts such as the channel members 21 and 22. Mounted within each of the channel members is a pair of metal blocks 21A, 21B and 22A, 22B, which are effective in combination with a third pair of blocks (not shown), mounted in another vertically disposed frame channel member, to secure the clamping flanges 3 and 4 of the stator assembly 1 in fixed relationship to the frame and housing 20. It should be understood that a greater number of similar housing frame channels and associated pairs of mounting blocks can be used in other embodiments of the invention. Generally speaking, it is preferable to install such channels with the channels equally spaced around the stator flanges. Moreover, it is desirable to align each of the V-shaped torque ribs, radially, with a respective one of the housing channel to provide a clean air flow pattern past the torque ribs and an aligned housing channel member to the outer wall of the housing.

When the stator core assembly 1 is mounted in its final operating position in the housing 20, the annular flange 4 will be seated on the L-shaped blocks 21B, 22B, etc. and the annular flange 3 will be positioned in nearly abutting relationship to the radially inner sides of blocks 21A, 22A, et cetera. It should be understood that each of these blocks will be precisely machined to fit within predetermined close tolerances the outer machined peripheries of the flanges 3 and 4, so that the stator core assembly 1 will be positioned concentrically within the housing 20, once it is positioned within the two sets of blocks. In order to secure the clamping flanges 3 and 4, respectively, to the two sets of blocks 21A, 22A and 22B, which are disposed in alignment with the outer edges of the clamping flanges, each of the blocks is secured to the clamping flange juxtaposed with it in any suitable well-known manner. In the preferred embodiment of the invention, the blocks are each welded to the outer peripheral surface of the juxtaposed clamping flange by applying a fillet weld with an arc welding machine, the welding tip of which can be conveniently inserted through the nearest open end of the machine housing 20. Thus, it is not necessary to leave any housing plates off of the housing 20 in order to provide access to the interior of the housing to effect such final welding of the stator core assembly 1 in fixed relationship to the housing, as was necessary in prior art mounting techniques for related types of packaged stator core assemblies and their associated housings.

It should be noted that the only welding used to rigidly fix the stator flanges 3 and 4 against rotation relative to the housing 30 is the welding that is applied to the flanges and the associated sets of blocks 21A, 22A, etc. and 21B, 22B. No intermediate so-called fishplates or other heavy structural members need be welded between the torque ribs of a stator assembly of the invention and the frame of an associated housing 20.

The very tight and rigid stator core assembly 1 afforded by the V-shaped torque ribs 11–16 and their mounting arrangement to the clamping flanges 3 and 4 obviates the need for such additional heavy structural members to adequately secure the package stator core assembly in the housing against the reaction torque of the machine during its operation. This advantageous result has been found to be particularly valuable in vertical dynamoelectric machine structures, such as the one shown for the preferred embodiment of the invention described herein. In such machines, only the bottom portion of the housing 20 is clamped against rotation by having a flange, such as flange 20A, bolted or otherwise suitably fixed in position on a foundation.

Figure 4:
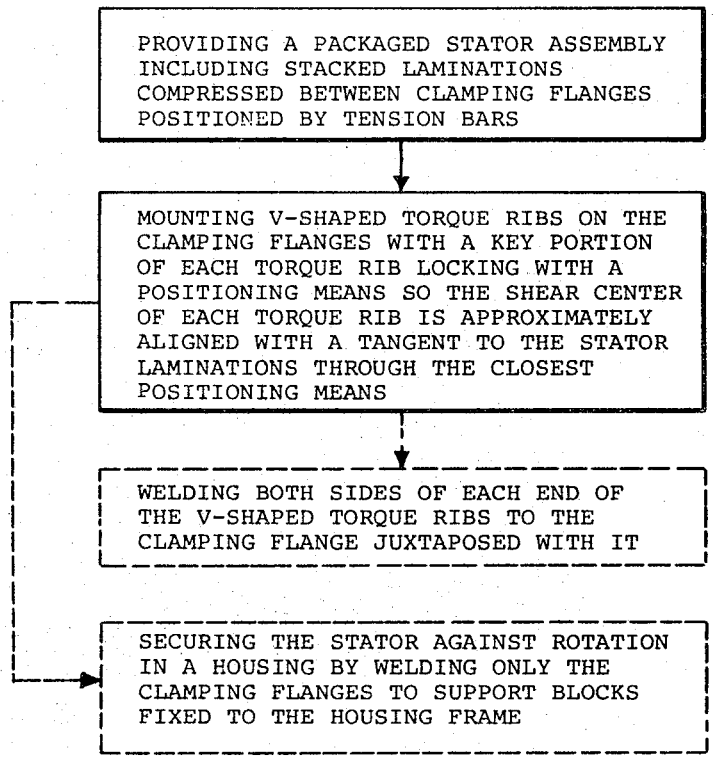
FIG. 4 is a flow chart illustrating one preferred form of the method of the invention.

Now that the structural features of the preferred embodiment of the invention have been described, reference is made to FIG. 4 of the drawing to explain the preferred method for making a dynamoelectric machine according to the invention. As is generally shown in FIG. 4, in order to make a dynamoelectric machine according to the invention, one first provides a packaged stator core assembly that includes a stack of laminations compressed between a pair of annular clamping flanges which, in turn, are held in position by a plurality of tension bars. A plurality of generally V-shaped torque ribs are then mounted between the clamping flanges of the stator assembly so that key portions at the apex of each of the torque ribs are located, respectively, in locking engagement with positioning means on the stack of stator laminations. The key portions on the respective torque ribs are each positioned so that the shear centers of the torque ribs are located approximately in alignment with tangents to the stator laminations projected through the positioning means closest to it. As noted above, the torque ribs are preferably mounted on the annular flanges 3 and 4 by being welded to them by applying welds to both sides of the ends of each V-shaped torque rib and the areas of the clamping flanges juxtaposed with those sides, as shown generally in Figure.

Finally, the packaged stator core assembly is secured against rotation in a housing by welding only the clamping flanges to support blocks fixed to the frame of the housing. That mounting method causes reaction torque forces to be transmitted from the stator laminations through the torque ribs to the clamping flanges and then through the mounting blocks of the housing to the housing frame and the associated housing. Because of the desired positioning of the shear centers of each of the torque ribs in substantial alignment with respective lines of force applied to the key portions of each rib by the positioning means on the stator laminations, the resultant stator assembly and associated housing mounting means are effective to rigidly and tightly secure the laminations of the stator core assembly against rotation or displacement due to either electro-dynamic forces or other forces such as those that may be applied by a seismic shock. This desirable tightness and rigidity are obtained even though only one end of the housing is secured against rotation by being mounted to a foundation member, in the manner shown for the vertical motor described above.

From the description of the invention presented above, those skilled in the art will recognize that various modifications and alterations may be made in the preferred embodiment of the invention using the teaching of it presented herein, therefore, it is my intention to encompass the true spirit and scope of the invention within the limits of the following claims.

What I claim as new and desire to secure by Letters Patent of the United States is:

1. A method of making a dynamoelectric machine comprising the steps of:
   a. providing a packaged stator core assembly including a stack of laminations compressed between a pair of annular clamping flanges that are held in position by tension bars,
   b. mounting a plurality of generally V-shaped torque ribs between the clamping flanges with a key portion at the apex of each torque rib held in locking engagement with a positioning means on the stack of laminations so that the shear center of each torque rib is approximately in alignment with a tangent to the stator laminations taken through the positioning means closest to said key portion, and
   c. securing the stator against rotation in a housing by welding only the clamping flanges to support blocks fixed to the frame of the housing.

2. A method as defined in claim 1 including the step of:
   b-1. welding both sides of each end of each V-shaped torque rib to a clamping flange juxtaposed with it.

* * * * *